United States Patent [19]

Stanford

[11] Patent Number: 5,002,591
[45] Date of Patent: Mar. 26, 1991

[54] HIGH EFFICIENCY PSA GAS CONCENTRATOR

[75] Inventor: Raymond A. Stanford, Rock Island, Ill.

[73] Assignee: VBM Corporation, Louisville, Ky.

[21] Appl. No.: 464,244

[22] Filed: Jan. 12, 1990

Related U.S. Application Data

[63] Continuation-in-part of Ser. No. 258,033, Oct. 14, 1988, abandoned.

[51] Int. Cl.$^5$ .............................................. B01D 53/04
[52] U.S. Cl. ............................................ 55/26; 55/62; 55/68; 55/162; 55/179; 55/387
[58] Field of Search ................... 55/18, 20, 21, 25, 26, 55/58, 62, 68, 74, 75, 160–163, 179, 387, 389

[56] References Cited

U.S. PATENT DOCUMENTS

| | | | |
|---|---|---|---|
| Re. 32,590 | 2/1988 | Sakuraya et al. | 55/62 X |
| 3,338,030 | 8/1967 | Feldbauer, Jr. | 55/62 X |
| 3,880,616 | 4/1975 | Myers et al. | 55/62 |
| 4,222,750 | 9/1980 | Gauthier et al. | 55/62 X |
| 4,331,455 | 5/1982 | Sato | 55/62 X |
| 4,348,213 | 9/1982 | Armond | 55/62 X |
| 4,349,357 | 9/1982 | Russell | 55/62 X |
| 4,376,640 | 3/1983 | Vo | 55/58 X |
| 4,404,005 | 9/1983 | Hamlin et al. | 55/179 X |
| 4,449,990 | 5/1984 | Tedford, Jr. | 55/62 X |
| 4,468,238 | 8/1984 | Matsui et al. | 55/62 X |
| 4,482,362 | 11/1984 | Yamazaki et al. | 55/62 |
| 4,519,813 | 5/1985 | Hagiwara et al. | 55/26 |
| 4,545,790 | 10/1985 | Miller et al. | 55/179 X |
| 4,552,571 | 11/1985 | Dechene | 55/179 X |
| 4,584,001 | 4/1986 | Dechene | 55/179 X |
| 4,636,226 | 1/1987 | Canfora | 55/179 X |
| 4,673,415 | 6/1987 | Stanford | 55/179 X |
| 4,698,075 | 10/1987 | Dechene | 55/179 X |
| 4,732,587 | 3/1988 | Koch | 55/179 X |
| 4,802,899 | 2/1989 | Vrana et al. | 55/179 X |

FOREIGN PATENT DOCUMENTS 2161717 1/1986 United Kingdom .................. 55/179

Primary Examiner—Robert Spitzer
Attorney, Agent, or Firm—Fay, Sharpe, Beall, Fagan, Minnich & McKee

[57] ABSTRACT

Improved operating efficiency is achieved in a PSA gas concentrator by connecting the primary product gas outlet end of a pressurized sieve bed with a gaseous mixture receiving end of a second molecular sieve bed between each pressure reversal portion of a PSA gas separation cycle. A cross over valve (12) has a first mode (12a) in which a first bed (16) is connected to a source (10) of pressurized air and a second bed (18) is connected with an exhaust port (14), a second mode (12b) in which the second bed is connected with the source of pressurized air and the first bed is connected with the exhaust port, and a third mode (12c) in which the passage of gas between the pressurized air source, the exhaust port, and the first and second beds is prohibited. Check valves (50a, 50b, 50c, and 50d) and a pressure equalization valve (52) selectively interconnect second ends (22, 26) of one bed with the first ends (20, 24) of the other. Primary product valves (54a, 54b) selectively interconnect the sieve beds with a primary product outlet port (34) and to the other sieve bed by feedback restricters (36, 40). When the cross valve is in either the first or second mode (12a, 12b) the pressure equalization valve (52) is closed and the product valves are open. When the cross over valve is in the third mode (12c), the primary product valves (54a, 54b) are closed and the pressure equalization valve (52) is opened. This allows the primary product gas to pass from the output end of the pressurized bed into the input end of the purged bed.

5 Claims, 2 Drawing Sheets

HIGH EFFICIENCY PSA GAS CONCENTRATOR

This application is a continuation-in-part of application Ser. No. 258,033, filed Oct. 14, 1988, now abandoned.

BACKGROUND OF THE INVENTION

The present invention relates to the art of gaseous separation. It finds particular application in conjunction with separating oxygen and nitrogen components of atmospheric air and will be described with particular reference thereto. It is to be appreciated, however, that the present invention may also find application in conjunction with the separation of other components of gaseous mixtures.

Heretofore, pressure swing adsorption (PSA) gas concentrators have commonly included first and second molecular sieve beds connected by a cross over valve to an air compressor. The cross over valve cyclically supplied atmospheric air under pressure to a bottom or input end of one of the sieve beds while purging the other sieve bed by venting or drawing a vacuum at its input end. The first sieve bed was filled with a zeolite or other material which, in the case of an oxygen concentrator, adsorbed the nitrogen component of the atmospheric air allowing the oxygen to pass through an outlet at an upper or outlet end of the sieve bed. A small part of the separated oxygen was fed back to the outlet end of the purging sieve bed and the remainder was supplied downstream as the primary product gas.

The zeolite in the first bed was only able to adsorb a fixed amount of nitrogen, as determined by surface area, number of adsorption sites, and other characteristics of the zeolite material. If air continued to be supplied under pressure to the first molecular sieve bed after the zeolite material was saturated with adsorbed nitrogen, large amounts of nitrogen gas would be discharged through the outlet, i.e. a breakthrough is said to occur. To prevent contamination of the output oxygen gas by breakthrough nitrogen, the cycle time for the cross over valve was selected to reverse the pressurized and purging sieve beds before breakthrough occurred.

At the instant when the cross over valve stopped supplying air under pressure to the first sieve bed, the first sieve bed contained substantially pure oxygen near its outlet end. The oxygen concentration decreased along the bed from substantially pure oxygen to atmospheric air at the inlet end. The exact amount of substantially pure oxygen and the oxygen concentration drop off rate was determined by how close to breakthrough the cross over valve changed states.

To conserve this already separated oxygen, others have provided a valve to interconnect the outlet ends of the two sieve beds to transfer this left over substantially pure oxygen to the recently purged or evacuated bed. Although moving the substantially pure oxygen was advantageous, the pressure equalization valve was commonly held open after breakthrough. As the pressure in the pressurized sieve bed decreased, adsorbed nitrogen was released. This release of nitrogen caused the gas that was transferred by the equalization valve to have a nitrogen concentration which exceeded that of atmospheric air. Worse yet, the substantially pure oxygen was pushed toward the inlet end of the recently purged bed while the nitrogen rich gas remained adjacent the outlet end. The nitrogen contamination of outlet end zeolite increased the chances that it would eventually be sent downstream with the output product gas.

Others have placed a pressure equalization valve between the inlet ends of the two beds. However, this placement of the equalization valve again introduced the leftover pressurized gas into the recently purged bed in the wrong order. Atmospheric air was introduced first followed by oxygen rich gas. However, because the reduction in pressure caused nitrogen gas to be released by the molecular sieve, increasing amounts of nitrogen became intermixed with the previously separated oxygen reducing its purity. However, the molecular sieve material in the recently purged bed adsorbed the nitrogen component of the first introduced gas such that the nitrogen was held closer to the bottom or inlet end of the recently purged tank. Although the energy necessary to compress the gas that remained in the first bed was conserved with the bottom end pressure equalization valve, the separated air was again introduced in wrong order, i.e. lowest oxygen concentration first, highest oxygen concentration second. Because the substantially pure oxygen gas was transferred last, it became contaminated with desorbed nitrogen and much of it remained in the first bed when equilibrium was reached.

The present invention contemplates a new and improved PSA gas concentrator and concentrating method which overcomes the above referenced problems and others.

SUMMARY OF THE INVENTION

In accordance with an apparatus aspect of the present invention, a PSA gas concentrator including a pair of molecular sieve beds, a cross over valve, a compressor, and other conventional components as described above is provided. Additionally, a pressure equalization valving means interconnects the outlet end of each bed with the inlet end of the other. This permits the two molecular sieve beds to be brought into pressure equilibrium by effectively interconnecting them in series outlet end to inlet end during the pressure equalization portion of the cycle.

In accordance with a method aspect of the present invention, a gaseous mixture is cyclically supplied to one molecular sieve bed while another is purged. Just before breakthrough occurs in the pressurized bed, pressurization is stopped and the two beds are brought into pressure equilibrium by interconnecting the outlet end of the pressurized bed with the inlet end of the purged bed. The two beds may be brought into complete pressure equalization or the pressure equalizing step may be terminated before equilibrium is reached such that only relatively pure, separated gas moves to the recently purged bed. Thereafter, the recently purged bed is pressurized and the pressurized bed is purged, i.e. the beds are cyclically reversed.

One advantage of the present invention is that it improves efficiency.

Bringing the beds into substantial pressure equilibrium conserves the energy that would otherwise be necessary to bring the purged bed to the equalization pressure.

Transferring gas from the outlet end of the pressurized bed to the inlet end of the purged bed starting just prior to breakthrough, conserves the separated oxygen gas rather than exhausting it during the purge.

Another advantage is that a smaller volume of air is required for a given volume of oxygen. The smaller air volume enables a smaller compressor to be used.

Still further advantages of the present invention will become apparent to those of ordinary skill in the art upon reading and understanding the following detailed description of the preferred embodiments.

DETAILED DESCRIPTION OF THE DRAWINGS

The invention may take part in various components and arrangements of components or in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
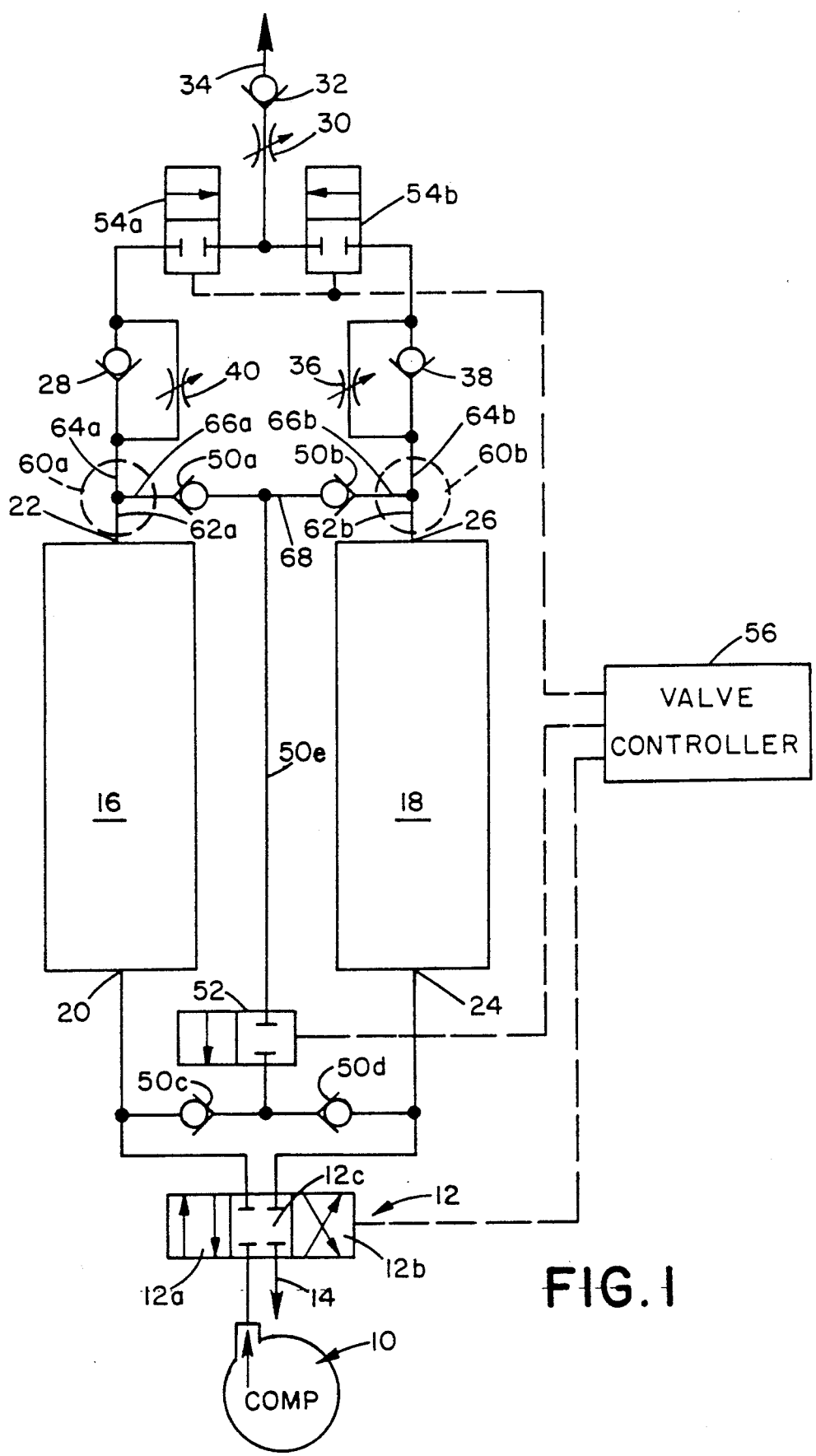
FIG. 1 is a diagrammatic illustration of a pressure swing adsorption gas concentrating system in accordance with the present invention.

With reference to FIG. 1, a compressor 10 selectively supplies air under pressure to a cross over valve 12. An exhaust port 14, which may be connected with an inlet of a vacuum pump or vented to atmosphere, is also connected with the cross over valve. The cross over valve has three states. In a first state, valve segment 12a is active such that the first molecular sieve bed 16 receives the gaseous mixture under pressure from the compressor and a second molecular sieve bed 18 is connected with the exhaust port 14. In a second state, cross over valve portion 12b is active such that the second bed receives the air under pressure and the first bed is connected with the exhaust port. In a third state, cross over valve portion 12c is active such that no air is received from the compressor or supplied to the exhaust port.

The first sieve bed has a lower or input end 20 which is connected to the cross over valve and an upper or output end 22 through which oxygen or other primary product gas is discharged. The second sieve bed analogously has a lower or input end 24 connected to the cross over valve and an upper or output end 26 through which the primary product gas is discharged. A check valve 28 permits the primary product gas from the first sieve bed to be channelled through a restricter valve 30 and a check valve 32 to a primary product output port 34. A feedback restricter 36 permits a small portion of the primary product gas from the first bed to be fed back into the output end 26 of the second bed. Analogously, a second check valve 38 permits the primary product gas from the second bed to be channelled to the output port 34 and a feedback restricter valve 40 permits a small fraction of the second bed output to be fed back to the output end 22 of the first sieve bed. A p r e s s u r e equalization valving means selectively interconnects the output end of one bed with the input end of the other. More specifically, a set of check valves 50a, 50b, 50c, and 50d permit gas to flow from the output end of the pressurized bed through a downcomer line 50e to the input end of a purged or evacuated bed when a pressure equalization valve 52 is open. The pressure equalization valve 52 is disposed at the lower most end of the downcomer line 50e immediately contiguous to check valves 50c and 50d. The check valves permit unidirectional flow between the inlet or outlets of the beds and the downcomer line. A product gas valving means including valves 54a and 54b selectively disconnects the outlet ends of the beds from the outlet port 34 and from each other. It is to be understood that line 50e is diagrammatically referred to as a "downcomer" line and does not necessarily imply a vertical orientation in any physical embodiment of this invention.

More specifically, a first T-connection 60a interconnects the first bed output end 22, check valve 50a and the check valve-feedback restricter assembly 28, 40. A second T-connection 60b interconnects with the second bed output end 26, the check valve 50b, and the feedback-check valve arrangement 36, 38. The T-connections include first legs 62a, 62b, respectively, that are connected with the first and second bed output ends, respectively. The T-connections have second legs 64a, 64b that are interconnected directly with the feedback means 40, 36, respectively. The T-connections have third legs 66a, 66b which are connected directly with first and second check valves 50a, 50b, respectively, which are connected directly to a first or uppermost end 68 of the downcomer line 50e. In this manner, the T-connection third legs define gas reservoirs or regions that are of minimal volume, which third leg volume is much smaller than the volume defined by the downcomer line between the uppermost end 68 and the equalization valve 52.

Check valves 50a, 50b, 50c, and 50d open immediately upon the creation of an appropriate pressure differential. This is in contrast to control valves which have an inherent delay time necessary to overcome the inertia in moving the valve element from the seat, which control valve delay time introduces complexity and delays into the timing of the operation.

Figure 2:
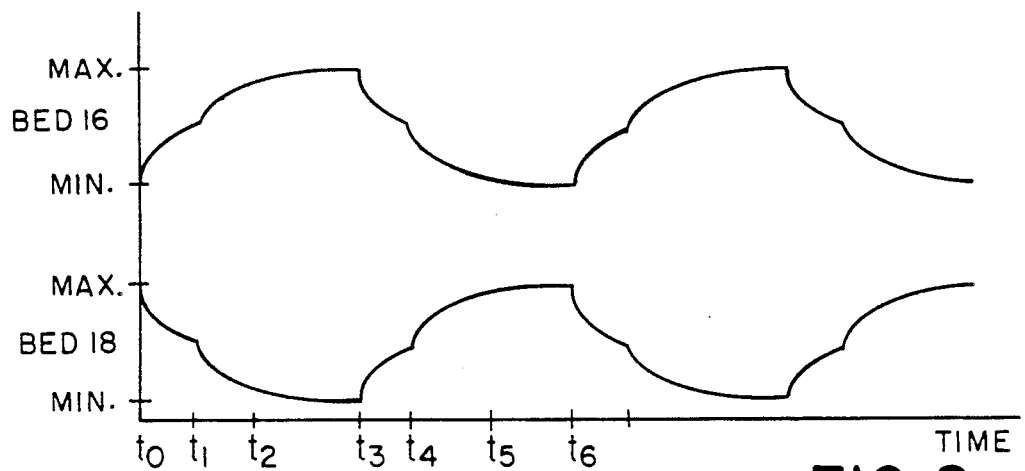
FIG. 2 illustrates the pressure vs. time characteristics of the two beds of the preferred embodiment.
Figure 3:
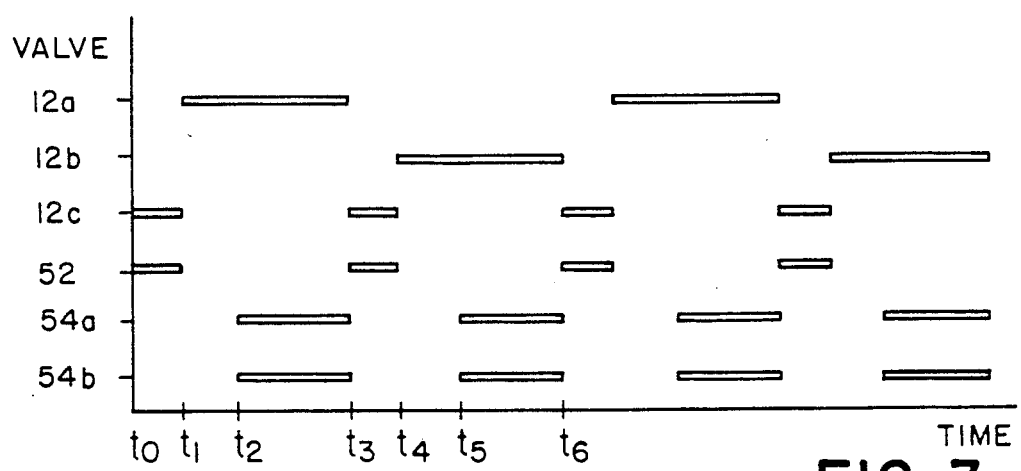
FIG. 3 is a valving diagram illustrating the opening and closing sequence of the valves of FIG. 1 and relative to the pressure characteristics of FIG. 2; and, FIG. 4 is a diagrammatic illustration of gas concentration at the input of the active bed, i.e. the bed which is not being purged.
Figure 4:
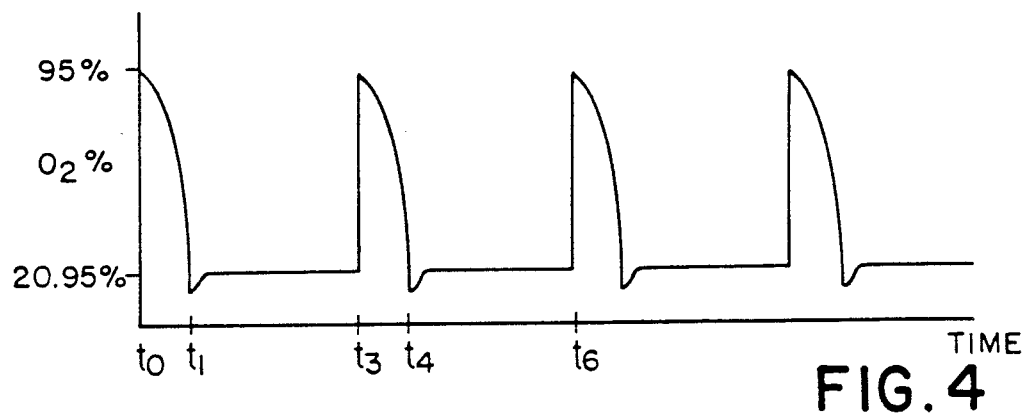

With continuing reference to FIG. 1, and further reference to FIGS. 2, 3, and 4, at an arbitrary time $t_0$, the second bed 18 is fully pressurized and approaching breakthrough. At $t_0$, cross over valve 12 is shifted from having segment 12b to having segment 12c active, i.e. from mode 12b to mode 12c. This stops further pressurization of the second bed 18 and prevents further exhausting of the first bed 16. The pressure equalization Valve 52 is opened such that output product gas from the output end 26 of the second bed flows through check valve 50b, equalization valve 52 and check valve 50c to the inlet end 20 of the previously exhausted first bed. Valves 54a and 54b are also closed at $t_0$ to prevent any gas from flowing to the outlet port 34 or between outlet ends 22, 26.

As illustrated in FIG. 2, the pressure in the second bed 18 begins to drop from full pressurization as the pressure in the first bed 16 begins to rise from its minimum pressure. The pressure in the downcomer line is between the pressures in the two beds. As illustrated in FIG. 4, the concentration of oxygen flowing from the second bed outlet end 26 to the inlet end 20 of the first bed begins to drop off rapidly as breakthrough occurs in the second bed. The decrease in pressure in the second bed 18 during equalization permits some of the adsorbed nitrogen to be released, causing the tail end of the equalization period to produce a greater concentration of nitrogen than atmospheric air.

The pressure equalization period is terminated at a time $t_1$ when the first and second beds are substantially in equilibrium. The equalization period is terminated by closing equalization valve 52 and moving the cross over valve to its first state in which segment 12a is active. After equalization valve 52 closes, the check valves 50a, 50b permit gas at a higher pressure than the downcomer line to pass into the downcomer line until these pressures equalize. The change in states of valve 12 may be triggered by a controller 56 that implements the valving pattern of FIG. 3 or by a pressure sensor.

As indicated in FIG. 2, at time $t_1$, the first and second beds have come into substantial pressure equilibrium. The contaminated primary product gas with the least oxygen or most nitrogen is retained in the first and third legs 62b, 66b of the second T-connection 60b. The gas with the next most nitrogen or least oxygen is retained in the downcomer tube 50e. The downcomer tube 50e, the legs of the second T-connection 60 and other portions of the path through which this gas has flowed are, of course, at the same pressure.

The equalization valve 52 may be closed earlier than pressure equalizations between beds 16 and 18 to allow only the most oxygen rich gas to be transferred at the cost of full pressure equalization. As yet another option, the cross over valve may continue to supply air to the pressurized bed after the equalization valve is open. This may be particularly advantageous if the adsorbed nitrogen is also a product gas which is recovered from the exhaust port 14.

Atmospheric air from the compressor 10 is pumped into the first bed 16 to increase its pressure as the second bed 18 is purged through the exhaust port 14. The product valves 54a and 54b may open at $t_1$ or may remain closed for a short duration after $t_1$ until a time $t_2$.

After the primary product valves 54a, 54b are opened at $t_2$, primary product gas is fed back through restricter 36, through the first and second legs 62b, 64b of the second T-connector, and into the second bed in which pressure is continuing to decrease. This draws the heavily nitrogen contaminated gas that was discharged just before $t_1$ from the first and second legs of the second T-connector 60b. Although some of the contaminated gas is drawn from the third leg, as the pressure rises, the heavily contaminated gas in the third leg 66b is pushed toward the check valve 50b by oxygen-rich primary product gas that is fedback through restricter 36. When the pressure in the second T-connection exceeds the pressure in the downcomer line during repressurization, the check valve 50b opens, allowing the contaminated gas to be pushed into the downcomer line. Because, within practicality, the volume of the third leg is minimal relative to the downcomer line, a small amount of primary product gas may also pass through the check valve 50b to equalize the pressure in the downcomer line with the pressure at the output of the second bed. It should be noted that the displacement of low purity gas away from where it could contaminate the product stream is facilitated by the use specifically of check valves, since controlled valves would not allow any spontaneous passing of gas on a rise of pressure.

Just before the breakthrough occurs at the first bed at a time $t_3$ the cross over valve is moved to its third state 12c, the pressure equalization valve 52 is opened, and the product valves 54a and 54b are closed. Product gas then flows from the outlet end 22 of the first sieve bed through check valve 50a, equalization valve 52 and check valve 50d to the inlet end 24 of the second bed.

When substantial equilibrium is reached at $t_4$, the equalization valve 52 is closed and the cross over valve is moved to its second state 12b. A short time later, $t_5$, the product valves 54a and 54b are opened and oxygen product gas is delivered to the outlet port 34. At time $t_6$, the cycle repeats.

Analogously, heavily contaminated gas from the end of the equalization cycle in which pressure from the first bed 16 is passed to the second bed 18 leaves a small amount of heavily contaminated gas in the first T-connection 60a. The contaminated gas in the first and second legs 62a, 64a is pushed back into the first bed by gas fed back through the restricter valve 40 as the first bed is being purged. The pressure increase of further purging to a pressure greater than the equilibrium pressure in the downcomer line 50e causes the remainder of the heavily contaminated gas that is trapped in the third leg 66a to be pushed toward or through check valve 50a into the downcomer line. If any nitrogen contaminated gas in the third leg does not get pushed through the check valve by the feedback gas, it will be pushed through at the start of the next oxygen output cycle before it can be carried to the primary product port.

It will be noted that placing the control valve 52 at the lowermost practical point of the downcomer line maximizes its useful volume which minimizes blow down and wastage of clean breakthrough gas at exhaust and facilitates receipt of the heavily contaminated breakthrough gas from the third leg of the T-connections. The use of check valves 50a, 50b assures that the downcomer line and the output of the primary product gas producing bed do not become interconnected until the primary product gas pressure exceeds the downcoming line pressure. This is important for certain control cycle schemes for if these valves were to experience actuation or deactivation delays, as controlled valves might, when the downcomer line had a higher pressure than the primary product gas, then heavily contaminated breakthrough gas would be pushed from the downcomer line into the primary product gas. The use of check valves eliminates any timing delays that would be necessary with controlled valves to assure that this reverse flow of contaminated breakthrough gas does not occur.

The invention has been described with reference to the preferred embodiment. Obviously alterations and modifications will be apparent to those of ordinary skill in the art upon and reading and understanding the preceding specification. It is intended that the invention be construed as including all such alterations and modifications insofar as they come within the scope of the appended claims or the equivalents thereof.

What is claimed is:

1. A method of separating a high purity primary product gas from a gaseous mixture, the method comprising:
   directing the gaseous mixture into an input end of a first bed containing a molecular sieve material that selectively adsorbs a first component of the gaseous mixture and connecting an input end of a second bed containing the molecular sieve material with an exhaust port;
   channeling a primary product gas from an output end of the first bed through first and second legs of a first T-connection to a primary product gas output port and feeding back a fraction of the primary product gas through first and second legs of a second T-connection into an output end of the second bed;

disconnecting the first bed from the source of the gaseous mixture and the second bed from the exhaust port and equalizing the pressure in the beds by permitting gas from the first bed to flow through the first T-connection first leg, a third leg of the first T-connection, a first check valve, a downcomer line, a pressure equalization control valve, and a second check valve into the input end of the second bed until the pressures in the first and second beds are generally equal, such that at the end of the pressure equalization step, primary product poor gas is retained in the first T-connection first and third legs;

connecting the second bed input end with a source of the gaseous mixture under pressure and connecting the first bed input end with the exhaust port such that primary product gas flows from the second bed output end through the second T-connection first and second legs to the product gas outlet port;

feeding back a fraction of the primary product gas from the second bed output end through the first T-connection first and second legs sweeping the primary product poor gas from the first T-connection first leg into the first bed;

when the pressure of the primary product gas in the first T-connection exceeds the pressure of the gas in the downcomer line, sweeping the primary product poor gas retained in the first T-connection third leg through the first check valve into the downcomer line such that it does not contaminate primary product gas passing to the product gas outlet port.

2. The method as set forth in claim 1 further including:

disconnecting the second bed from the source of the gaseous mixture and the first bed from the exhaust port and equalizing the pressure in the beds by permitting gas from the second bed to flow through the second T-connection first and third legs, a third check valve, the downcomer line, the pressure equalization control valve, and a fourth check valve into the input end of the first bed until the pressures in the first and second beds are generally equal, such that at the end of the pressure equalization step, primary product poor gas is retained in the second T-connection first and third legs;

connecting the first bed input end with a source of the gaseous mixture under pressure and connecting the second bed input end with the exhaust port such that primary product gas flows from the first bed output end through the first T-connection first and second legs to the product gas outlet port;

feeding back a fraction of the primary product gas from the first bed output end through the second T-connection first and second legs sweeping the primary product poor gas from the second T-connection first leg into the second bed;

when the pressure of the primary product gas in the second T-connection exceeds the pressure of the gas in the downcomer line, sweeping the primary product poor gas retained in the second T-connection third leg through the third check valve into the downcomer line such that it does not contaminate primary product gas passing to the product gas outlet port.

3. A gas separation apparatus comprising:

a first bed containing a molecular sieve material that selectively adsorbs at least a first component of a gaseous mixture and having a first bed first end and a first bed second end;

a second bed containing the molecular sieve material and having a second bed first end and a second bed second end;

a cross over valve means having three modes, a first mode in which the first bed first end is connected with a source of the gaseous mixture under pressure and the second bed first end is connected with an exhaust port, a second mode in which the second bed first end is connected with the source of the gaseous mixture under pressure and the first bed first end is connected with the exhaust port, and a third mode in which the passage of gas between the source of gaseous mixture under pressure, the exhaust port, and the first and second bed first ends is blocked;

a product gas outlet port operatively connected with the first bed second end and the second bed second end;

a feedback means for selectively feeding back a portion of the primary product gas passing from the first bed second end to the second bed second end and for selectively passing a fraction of the primary product gas passing from the second bed second end to the first bed second end; and, a pressure equalizing means for selectively interconnecting the first bed second end with the second bed first end and the second bed second end with the first bed first end, the pressure equalizing means including:

a first T-connection having a first leg connected with the first bed second end, a second leg connected with the feedback means, and a third leg connected directly with a first check valve without an intervening control valve, which first check valve is connected directly to a first end of a downcomer line without intervening controlled valves such that when the feedback means is passing primary product gas to the first bed second end, the primary product gas flushes breakthrough gas from the first and second legs and their respective interconnecting tubing back into the first bed second end and when the pressure of primary product gas in the first T-connection exceeds the pressure in the downcomer line, the primary product gas pushes the breakthrough gas in the third leg through the first check valve into the downcomer line;

a second T-connection having a first leg connected with the second bed second end, a second leg connected with the feedback means, and a third leg connected directly with a second check valve which is connected directly to the downcomer line first end without intervening controlled valves, such that when the feedback means is passing primary product gas to the second bed second end, the primary product gas flushes breakthrough gas from the first and second legs and respective interconnecting tubing back into the second bed second end and when the pressure of the primary product gas in the second T-connection exceeds the pressure in the downcomer line, the primary product gas pushes the breakthrough gas in the third leg through the second check valve into the downcomer line;

a valving means which selectively connects a second end of the downcomer line with the first bed first end and the second bed first end.

4. A gas separation apparatus comprising:

a first bed containing a molecular sieve material that selectively adsorbs at least a first component of a gaseous mixture and having a first bed first end and a first bed second end;

a second bed containing the molecular sieve material and having a second bed first end and a second bed second end;

a cross over valve means having three modes, a first mode in which the first bed first end is connected with a source of the gaseous mixture under pressure and the second bed first end is connected with an exhaust port, a second mode in which the second bed first end is connected with the source of the gaseous mixture under pressure and the first bed first end is connected with the exhaust port, and a third mode in which the passage of gas between the source of gaseous mixture under pressure, the exhaust port, and the first and second bed first ends is blocked;

a product gas outlet port operatively connected with the first bed second end and the second bed second end;

a pressure equalizing means for selectively interconnecting the first bed second end with the second bed first end and the second bed second end with the first bed first end, the pressure equalizing means including:

a first check valve directly interconnecting the first bed second end and a first end of a downcomer line without intervening control valves;

a second check valve directly interconnecting the second bed second end and the downcomer line first end without intervening control valves;

a controlled valve connected with a second end of the downcomer line;

a third check valve directly connecting the controlled valve with the first bed first end;

a fourth check valve directly connecting the controlled valve with the second bed first end;

the controlled valve and the third and fourth check valves being disposed immediately adjacent the first bed first end and the second bed first end such that blow down and wastage of lean breakthrough gas and exhaust are minimized.

5. The apparatus as set forth in claim 4 further including:

a feedback means for selectively feeding back a portion of the primary product gas passing from the first bed second end to the second bed second end and for selectively passing a fraction of the primary product gas passing from the second bed second end to the first bed second end;

and wherein the pressure equalizing means further includes:

a first T-connection having a first leg connected with the first bed second end, a second leg connected with the feedback means, and a third leg connected directly with the first check valve without intervening controlled valves such that when the feedback means is passing primary product gas to the first bed second end, the primary product gas flushes breakthrough gas from the first and second legs and their respective interconnecting tubing back into the first bed second end and when the primary product gas pressure in the first T-connection exceeds the pressure in the downcomer line, the primary product gas pushes the breakthrough gas in the third leg through the first check valve into the downcomer line;

a second T-connection having a first leg connected with the second bed second end, a second leg connected with the feedback means, and a third leg connected directly with the second check valve, such that when the feedback means is passing primary product gas to the second bed second end, the primary product gas flushes breakthrough gas from the first and second legs and respective interconnecting tubing back into the second bed second end and when the primary product gas pressure in the second T-connection exceeds the pressure in the downcomer line, the primary product gas pushes the breakthrough gas in the third leg through the second check valve into the downcomer line;

such that disposing the controlled valve closely adjacent the first and second bed first ends causes the downcomer line to have a volume that is sufficiently larger with respect to the third leg volumes that the breakthrough gas in the third leg of the first and second T-connections is effectively received followed by primary product gas which increases primary product gas concentration of the breakthrough gas in the downcomer line.

* * * * *